Jan. 5, 1926. 1,568,926
B. V. STOLL
RELEASE VALVE
Filed Oct. 26, 1922 2 Sheets-Sheet 1
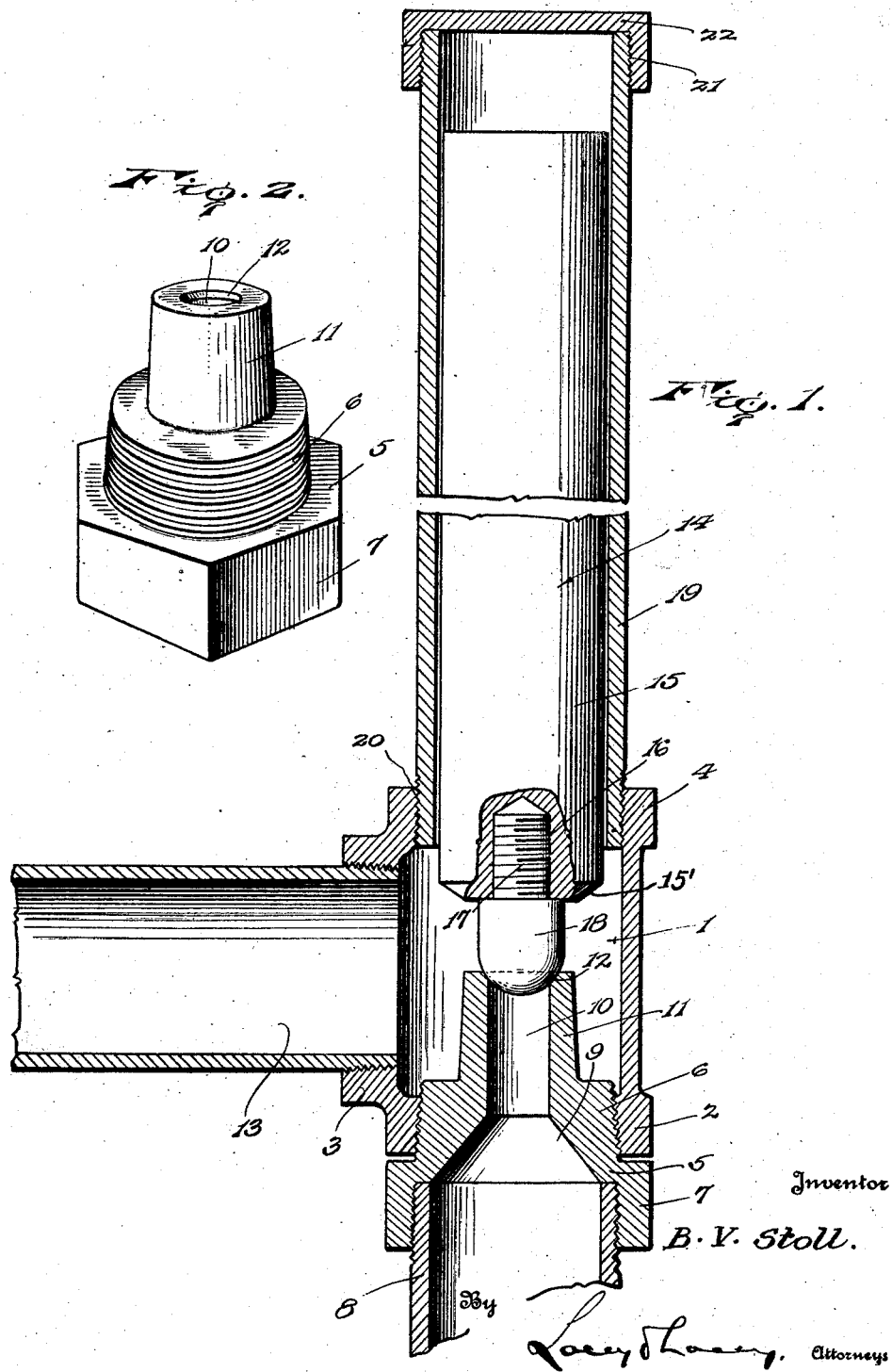
Inventor
B. V. Stoll.
By
Attorneys

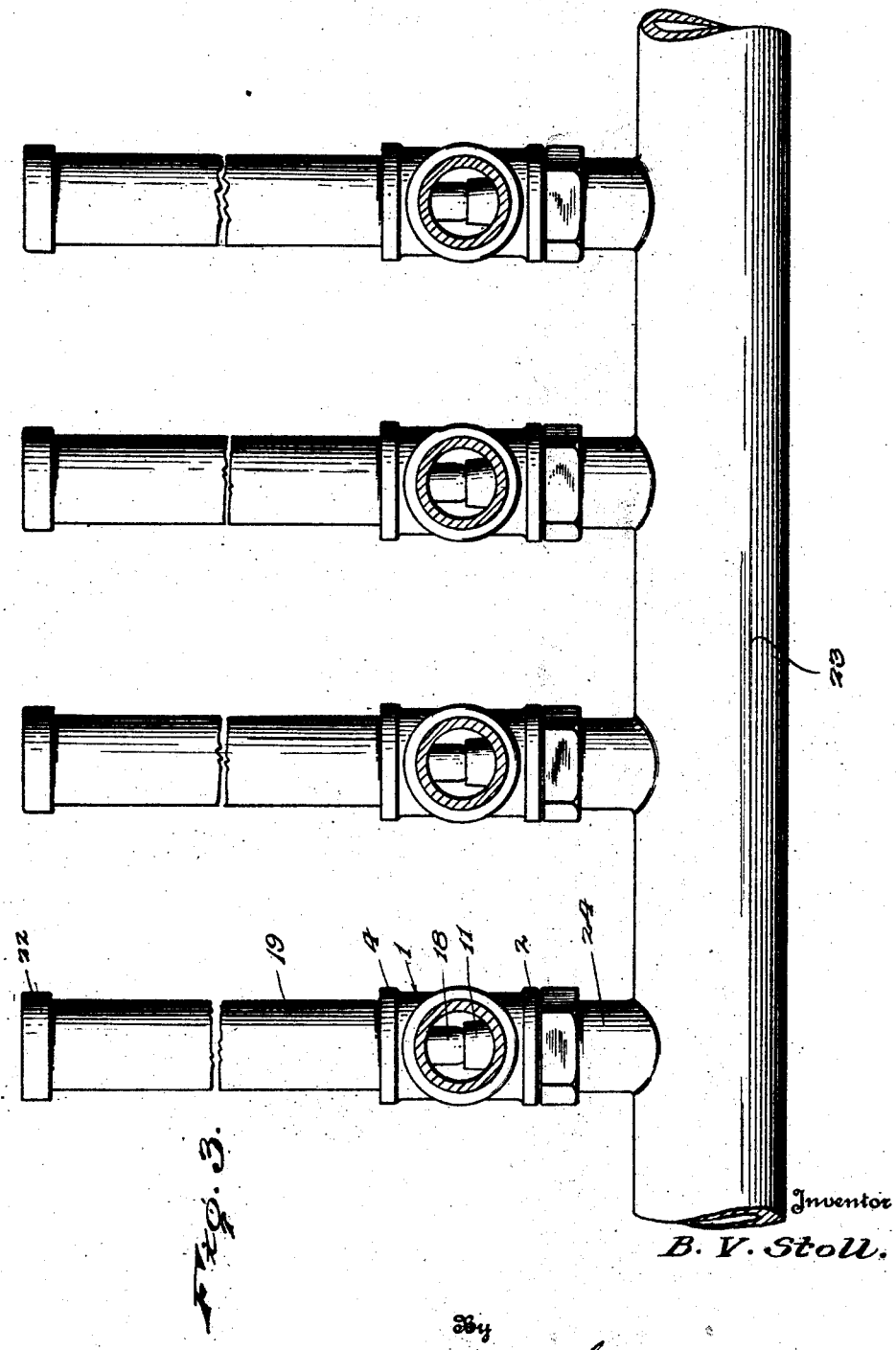

Patented Jan. 5, 1926.

1,568,926

UNITED STATES PATENT OFFICE.

BERRY V. STOLL, OF LOUISVILLE, KENTUCKY.

RELEASE VALVE.

Application filed October 26, 1922. Serial No. 597,009.

*To all whom it may concern:*

Be it known that I, BERRY V. STOLL, a citizen of the United States, residing at Louisville, in the county of Jefferson and State of Kentucky, have invented certain new and useful Improvements in Release Valves, of which the following is a specification.

This invention relates to improvements in release valves and while the valve embodying the invention is designed primarily for embodiment in an oil cracking apparatus such as disclosed in my co-pending application, filed October 26, 1922, Serial No. 597,010, it is adapted for use in various other connections, such as a steam valve for boiler release or for any use where a reducing or blow off valve can be used.

The valve embodying the invention is designed essentially for employment where fluid under pressure is to be released when the pressure reaches a predetermined maximum degree. Heretofore such valves have ordinarily embodied packings which if made sufficiently tight to prevent leakage, are liable to inhibit free movement of the valve with the result that such valves do not always open with certainty under the calculated pressure. Where such valves have not been inefficient for the reason stated, they are usually found to be inefficient for other reasons and so uncertain in their action as to render them unreliable. Therefore, it is one of the primary objects of the present invention to provide a valve for the purpose stated which will open with certainty at the pressure for which it was designed and which will be devoid of any packings, springs, or other parts which might offer undue resistance to its opening movement at the predetermined degree of pressure, and which valve may therefore be depended upon to perform its function at such time.

Another object of the invention is to so construct the valve that access may be readily had to its operating parts for the purpose of cleaning and repairing the same if occasion should require that this be done.

Another object of the invention is to so construct the valve that by a calculated proportioning of its parts it may be adapted to open at a predetermined maximum pressure and without the necessity of depending upon the tension adjustment of springs or making any other adjustments.

Another object of the invention is to so construct the valve that it will offer minimum resistance to the flow of fluid past it upon movement to open position.

In the accompanying drawings:

Figure 1 is a vertical sectional view through the valve embodying the invention, parts being shown in elevation;

Figure 2 is a perspective view of the combined valve seat and bushing removed from the casing;

Figure 3 is a perspective view illustrating a multiple valve arrangement.

The valve casing is indicated in general by the numeral 1 and the same is preferably in the form of a T although a casing of some other type might be employed. For example, while the casing is illustrated in the drawings as provided with threaded connections for the various pipe fittings and the bushing, it will be understood that it might be flanged to provide for the connections being made by the use of bolts. The several branches of the casing are indicated one by the numeral 2, another by the numeral 3, and a third by the numeral 4, and these branches are interiorly threaded, and into the branch 2 there is fitted a bushing 5 having an exteriorly threaded intermediate body portion 6 which is fitted into the said branch 2, and provided with a polygonal portion 7 to which a wrench may be applied in fitting the bushing into place and in removing the same. The portion 7 of the bushing is also interiorly threaded to accommodate one end of a pipe 8 through which the liquid, the flow of which is to be controlled, is introduced into the casing. The bore of the bushing is reduced to conical form, as at 9, in the intermediate portion 6 of the bushing, and above this portion is further reduced to cylindrical form, as at 10, this latter portion of the bore extending axially through a nipple 11 which is located wholly within the casing 1 and which has its upper end terminating substantially at the center of the casing. The upper end of this nipple is provided with a valve seat 12 which may be of the concave contour illustrated in the drawings, flat, conical, or of any other form depending upon the contour of the valve which is to coact therewith. An outlet pipe 13 is fitted into the branch 3 of the valve casing and conducts the liquid away from the valve when the valve opens under the predetermined maximum pressure.

The valve is indicated in general by the numeral 14 and the same comprises a stem or body 15 which is preferably of cylindrical form and is of a diameter and length calculated to determine the mass or weight of the valve, the lower end of said body being preferably beveled at 15' so as to assist in directing the water through the discharge outlet 15. A threaded socket 16 is formed in the lower end of the body 15, and into this socket is fitted the stem 17 of the head of the valve which head is indicated by the numeral 18. The said valve head 18 may have a substantially spherical contour at its seating end as illustrated in the drawings, or it may be flat or conical or of any other desired contour, and it is so proportioned as to fit snugly upon the seat 12 and be firmly retained in place thereon through the weight imposed upon it by the body 15. The body 15 is slidably supported in upright position within a tubular casing 19 which is removably threaded at its lower end, as at 20, into the branch 4 of the valve casing 1. At its upper end this tubular casing is exteriorly threaded, as at 21, to accommodate a cap 22 which closes its said end, and the tubular casing 19 is interiorly of a diameter to slidably and yet not too snugly receive the body 15 of the valve.

It will be understood from the foregoing that in practice the valve body 15 will be proportioned, in accordance with the diameter of the bore 10, so that the valve will remain closed until the pressure against its head 18 has reached a predetermined maximum degree above which the valve will be unseated and the fluid under pressure will pass from the casing 1 through the outlet pipe 13. With the valve body properly proportioned to obtain the required mass or weight, there will, of course, be no need for any subsequent adjustment, and the valve will with certainty open at the predetermined pressure.

Should it become desirable or necessary to clean the valve or make repairs thereto, as, for example, by the substitution of a new head 18, or a regrinding of the seat 12, access may be readily had to the parts by unthreading the tubular casing 19 from the valve casing 1, and, of course, the parts may, after such repairs have been effected or the valve has been cleaned, be readily reassembled. Also it will be evident that by removing the casing 19 and substituting a longer or shorter casing, a heavier or lighter valve body may be accommodated.

In the embodiment of the invention shown in Figure 3 of the drawings the numeral 23 indicates a manifold provided with a number of branches 24 corresponding to the pipe 8 previously described, and upon each of these branches there is mounted one of the valves embodying the invention. This structure is employed under conditions where it is desirable to deliver a maximum volume of fluid which volume could not be practically delivered by the use of a single valve and single discharge pipe.

It will be understood that in view of the modifications which might be made in the structure, the member 19 may be considered as an extension of the valve casing 1. Also the body 15 may be considered as a weight-imposing body carrying the valve head 18 and holding the same to its seat.

Having thus described the invention, what is claimed as new is:

1. A release valve comprising a casing having inlet and outlet openings of substantially the same diameter as the casing, the walls of which are threaded and disposed substantially at right angles to each other, a bushing threaded into the inlet opening and having its upper end reduced to form an elongated upstanding nipple the upper end of which is provided with a concave valve seat disposed in a horizontal plane and arranged at a point substantially opposite the center of the outlet opening, said bushing being provided with a cylindrical bore opening through the valve seat and having the walls of the bore at the base of the nipple beveled to form a conical chamber, an inlet pipe threaded in the lower end of the bushing and abutting against said bushing at the base of the conical chamber, an outlet pipe engaging the threaded walls of the outlet in the casing, a cylindrical extension having its entire lower end open and threaded in the upper portion of the casing, a correspondingly shaped weight-imposing member slidably mounted for vertical movement in the cylindrical extension substantially filling the open end thereof, a valve threaded in the center of the lower end of the weight-imposing member and having its lower end provided with a substantially semi-spherical surface for engagement with the valve seat, and a removable closure for the upper end of the cylindrical extension.

2. A release valve comprising a casing having an inlet and an outlet arranged at substantially right angles to each other and of substantially the same diameter as said casing, a concave valve seat located at the junction of the inlet and outlet, an extension fitted to the casing with its entire lower end open and communicating with the interior of said casing above the valve seat, a solid integral weight-imposing cylindrical member slidably mounted for vertical movement within the extension and substantially filling the open end thereof, said weight-imposing member having its lower end provided with a centrally disposed threaded socket and its lower peripheral edge beveled downwardly and inwardly in the direction of said socket, and a valve head having a threaded shank removably fitted into the socket and having its lower end projecting below the beveled edge of the weight-imposing member and provided with a substantially semi-spherical lower face for engagement with said concave valve seat.

In testimony whereof I affix my signature.

BERRY V. STOLL.